(12) United States Patent
Carlier

(10) Patent No.: US 12,054,213 B2
(45) Date of Patent: Aug. 6, 2024

(54) BICYCLE LOCK

(71) Applicant: MA Micro Limited, Woking (GB)

(72) Inventor: Ties Jonan Midas Carlier, Amsterdam (NL)

(73) Assignee: MA Micro Limited, Woking (GB)

( * ) Notice: Subject to any disclaimer, the term of this patent is extended or adjusted under 35 U.S.C. 154(b) by 912 days.

(21) Appl. No.: 17/048,931

(22) PCT Filed: Apr. 17, 2019

(86) PCT No.: PCT/NL2019/050227
§ 371 (c)(1),
(2) Date: Oct. 19, 2020

(87) PCT Pub. No.: WO2019/203644
PCT Pub. Date: Oct. 24, 2019

(65) Prior Publication Data
US 2021/0237817 A1    Aug. 5, 2021

(30) Foreign Application Priority Data

Apr. 17, 2018 (NL) ........................................ 2020779

(51) Int. Cl.
*B62H 5/14* (2006.01)
*B62H 5/18* (2006.01)

(52) U.S. Cl.
CPC ............ *B62H 5/141* (2013.01); *B62H 5/145* (2013.01); *B62H 5/18* (2013.01)

(58) Field of Classification Search
CPC ........... B62H 5/18; B62H 5/145; B62H 5/141
See application file for complete search history.

(56) References Cited

U.S. PATENT DOCUMENTS

| | | | | |
|---|---|---|---|---|
| 4,708,004 | A * | 11/1987 | Allen | B62H 5/14 70/228 |
| 5,133,201 | A * | 7/1992 | LaMott | B60R 25/09 70/226 |
| 5,410,897 | A * | 5/1995 | Edmondson | B60R 25/093 70/237 |
| 8,085,137 | B2 * | 12/2011 | Weiershausen | B62H 5/18 70/228 |
| 10,131,390 | B2 | 11/2018 | Kalupner | |
| 10,549,801 | B2 * | 2/2020 | Lee | B62H 5/141 |

(Continued)

FOREIGN PATENT DOCUMENTS

| | | | |
|---|---|---|---|
| CN | 104494735 A | * | 4/2015 |
| CN | 204750367 U | | 11/2015 |

(Continued)

*Primary Examiner* — Mark A Williams
(74) *Attorney, Agent, or Firm* — The Webb Law Firm

(57) ABSTRACT

The present invention relates to a bicycle lock for blocking of a wheel of a bicycle in a locked state. The bicycle includes a tube assembly including a frame with mutually fixed tube elements and movable tube elements, such as a front stay. The bicycle includes a housing, a bolt for providing a blocking action in a blocking state with which the wheel is blockable, a channel for arranging therein of the bolt, and a latch for, in a latching state of the lock, keeping the latest in the blocking state. The latch in the blocking state is in cooperation with receiving means defining a state of cooperation in which the bolt and the receiving means block the wheel of the bicycle.

23 Claims, 11 Drawing Sheets

(56) References Cited

U.S. PATENT DOCUMENTS

| | | | |
|---|---|---|---|
| 2008/0041127 A1* | 2/2008 | Xavier | B62H 5/18 70/228 |
| 2008/0053766 A1* | 3/2008 | Costa | B62H 5/18 188/344 |
| 2016/0059918 A1* | 3/2016 | Hensley | B62H 5/001 70/233 |

FOREIGN PATENT DOCUMENTS

| | | | | |
|---|---|---|---|---|
| CN | 206384077 U | * | 8/2017 | |
| CN | 112009602 A | * | 12/2020 | |
| CN | 112292309 A | * | 1/2021 | B62H 5/003 |
| DE | 102004054331 A1 | | 6/2005 | |
| DE | 102008020951 A1 | | 10/2009 | |
| EP | 3305635 A2 | | 4/2018 | |
| GB | 2310839 A | | 9/1997 | |
| JP | 2009502630 A | | 1/2009 | |
| NL | 1017815 C2 | | 10/2002 | |
| WO | 9839200 A1 | | 9/1998 | |
| WO | 2016095890 A1 | | 6/2016 | |
| WO | 2017160140 A1 | | 9/2017 | |

\* cited by examiner

BICYCLE LOCK

CROSS-REFERENCE TO RELATED APPLICATIONS

This application is the United States national phase of International Application No. PCT/NL2019/050227 filed Apr. 17, 2019, and claims priority to The Netherlands Patent Application No. 2020779 filed Apr. 17, 2018, the disclosures of which are hereby incorporated by reference in their entirety.

BACKGROUND OF THE INVENTION

Field of the Invention

The present invention relates to a bicycle lock for blocking of a wheel of the bicycle in a locked state. Furthermore, the present invention relates to an end piece of a tube element for receiving and/or housing of the bicycle lock. Furthermore, the present invention relates to a ring or disk for cooperating with the bicycle lock.

Description of Related Art

Many forms of logs are known for the purpose of closing or locking of a bicycle. Such locks are based on many principles of functioning. A known principle of functioning is preventing of rotation of a wheel of a bicycle for the purpose of inhibiting taking along of the bicycle. To this end, generally the known ring locks are known, but also cable locks or chain locks for passing through the wheel.

SUMMARY OF THE INVENTION

The present inventor develops the lock according to the present invention based on the per se known principle of functioning of blocking of a wheel, but while applying a totally different inventive concept.

To this end, the present invention provides a wheel lock for in a locked state blocking of a wheel of a bicycle, the bicycle comprising a tube assembly comprising a frame with mutually fixed tube elements and movable tube elements, such as a front stay, the bicycle comprising:
  a housing,
  a bolt for providing of a blocking action in a blocking state with which the wheel is blockable,
  a channel for arranging therein of the bolt,
  a latch for, in a latching state of the lights, keeping the latest in the blocking state,
  wherein the latch in the blocking state is in cooperation with receiving means defining a state of cooperation in which the bolt and the receiving means block the wheel of the bicycle.

The lock can be very advantageously transferred to the locked state by means of transferring, such as by means of pushing, of the bolt to the blocking state in cooperation with the receiving means. Thereby, it is preferably provided that this pushing in of the bolt is performed by manpower by means of pushing or kicking thereof. Subsequently the latch latches the bolt in the blocking state because of which the lock is directly locked.

According to a first preferred embodiment, the housing is mounted to the tube assembly, preferably at a front stay or rear stay. With this, it is advantageously achieved that the lock is mounted very robustly to, connected with or part of the bicycle.

Such a placement provides as further advantage that by means of the receiving means arranged at a wheel, the bicycle is rotationally lockable relative to the tube assembly comprising the frame. With this, removal of the bicycle with a rotatable wheel is prevented in an advantageous manner. Such an arrangement close to, at or around the hub or axle of the wheel provides an advantageously realizable firm mounting of such a preferred receiving means.

According to a further preferred embodiment, the receiving means define at least a space for receiving therein of the latch in the blocking state. With this, it is advantageously achieved that the bolt is insertable into such at least one space. Further preferably, the boundaries of the space provide means for blocking of a wheel against rotation relative to the tube assembly.

Further preferably, the receiving means are arranged at a wheel, preferably the rear wheel, further preferably wherein the receiving means are formed by a fixed part of the wheel suitable for restraining the bolt, such as an opening in a brake disc. With this, the blocking of the real is provided as indicated in the above.

According to a further preferred embodiment, the receiving means are formed by an as part of the lock provided receiving member or receiving assembly. With this, the receiving means are definable as part of the bicycle lock, including when the mounting is at a movable part relative to the housing, such as the receiving means at the wheel and the house at the tube assembly or the house at the wheel and the receiving means at the tube assembly.

Further preferably, the receiving member is formed by a ring or disk mounted at the wheel, or comprises the receiving member openings and/or recesses for receiving of the bolt, preferably wherein the openings and/or recesses are provided to with tapered walls. Advantage of such a ring or disk is that it can rotate with the wheel such that to this end relative to the hub and/or the tube assembly a predetermined position is maintainable. Such an opening or recess as an advantage that these are applicable in a suitable manner as embodiment for the receiving means as these define a state of cooperation in which the bolt and the receiving means block the wheel of the bicycle. A further advantage of such openings or recesses is that a very robust receiving member is formable. The further preferred tapered walls provide as advantage that with these, the bolt is drivable out of the blocking state.

According to a further preferred embodiment, the latch is a sliding latch or a cantilever latch. By means of such a latch, the bolt is legible in the blocking state. With this, the locked state of the lock is secured. Alternatively, electromechanical latching is provided.

Further preferably, the bicycle lock comprises actuation means for the bolt to actuate the bolt, such as from and/or to the blocking state. Preferably, such bolt actuation means are provided as arranged for actuation by means of a human operation by means of the hand, food, or by means of a further body part. With this, it is provided that the user actively and directly operates the lock for locking of the bicycle. In operation at the location of the housing, preferably at the outside of the housing as seen relative to a respective wheel, preferably at the outside of the housing at the outside of the rear stay, further preferably rear bottom stay, is provided. In an alternative manner, the bolt actuation means are provided as operable by means of a control of the bicycle, such as is described below in greater detail, or by means of a button operation with electrical actuation of the bolt.

For the purpose of moving of the latch to and/or from the latching state, the lock further preferably comprises latch actuation means for actuating of the latch, such as from and/or to the latching state. Such latch actuation means are preferably provided by means of a biasing member, such as a spring. Alternatively, these are provided by means of a mechanical drive, such as by means of a drive motor or a solenoid.

According to a further preferred embodiment, the bicycle lock comprises a latch blocking assembly for keeping the latch blocked in the latching position, preferably comprising an electric actuator, further preferably comprising a solenoid, further preferably a solenoid in magnetic operation with a magnet, further preferably wherein an actuation pin of the solenoid is provided a ball of a reversible magnetic field for the purpose of attracting or repelling of the magnet. By means of such features according to the preferred embodiments, the keeping in the latching position of the lights blocking assembly is advantageously realized. Of the latch, it is prevented that it is movable out of a slot of the bolt because it is restrained by the latch blocking assembly, the actuation pin thereof and/or the magnet thereof, depending on the embodiment. Because the latch is herewith holdable in the blocking state, the lock is only an lockable by means of actuating of the lights blocking assembly or the solenoid thereof, preferably in combination with the magnet thereof, in case presence.

Preferably, the user operates the bicycle for opening of the bicycle lock. For this purpose, it is provided that the user for example enters a pin code, or operates the lock from an application on a mobile telephone. The communication with the bicycle lock is preferably performed fire the central control unit of the bicycle. An authentication of the mobile phone is provided via the pairing of a Bluetooth connection between the telephone and a control unit of the bicycle and/or an authentication between the control unit of the bicycle and the application on the telephone.

Further preferably, the bicycle comprises a latch unblocking assembly for moving the latch out of the latching position, preferably comprising an electric actuator, further preferably comprising an electric motor, further preferably comprising a rotation motor with a latch actuating cam. Such a latch unblocking assembly according to this preferred embodiment functions preferably in combination with a cantilever latch in order to tipped latch relative to the releasing of the bolt.

According to a further preferred embodiment, the bicycle lock comprises a state sensor, preferably embodied as a switch, for perceiving whether the latch is in the blocking state, wherein further preferably the state sensor is connectable with a control unit of the bicycle for the purpose of receiving of a status signal of the state sensor by the control unit. By means of such a status signal of the state sensor, the state of the lock as being locked and/or being open is output able from the lock towards a control unit of the bicycle. The outputs of a signal directed at the state as being locked provides advantageously information to the control unit of the bicycle with regard to the possibility of switching off of a contact lock function of the bicycle, such as for the purpose of a propulsion, bringing the bicycle in an idol or standby position, and/or switching on of an alarm function of the bicycle.

Further preferably, the bicycle lock comprises positioning means, such as a positioning pin for keeping the bolt out of the blocking state, preferably for positioning the bolt in an opened position. In cooperation with our hereto suitable slot of the a blocking force that may be overcome is provided advantageously for keeping the bolt in the opened state. This blocking force that may be overcome is small in such a way that when operating the bolt, this functions as a recognizable operating feature of a user interface of the lock. The user hereby knows that the bolt is reasonably expected to be in the opened state and can be operated with a known force.

According to a further preferred embodiment, the bolt is removable from the channel. With this, it is advantageously achieved that the bolt is mountable or mounted to a cable or chain that may be arranged around a fixed object for blocking of the bicycle lock and there with the bicycle to the fixed object. Here with, the safety of the bicycle is improved in the sense that removing of the bicycle while it is locked is prevented. Because of this, and authorized removing of the bicycle while it is locked is relatively disadvantageous because the amount of time that this requires is raised. Fixed objects that are considered to this end comprise a pole, lamp post, ring that is mounted to a façade, fencing and/or parking device for a bicycle. Further preferably, the housing is arranged in, is arrangeable in or is part of a tube element of the bicycle, preferably a stay of the bicycle, further preferably a rear stay, further preferably a rear under stay of the bicycle. With this, the manufacturability of the bicycle and/or the firmness of the bicycle lock is advantageously achieved. Further preferably, the bicycle lock comprises a part or body that is arrangeable inside the housing, such as a mold piece, for holding of therein arrangeable parts of the bicycle lock, such as described in the following description relating to the drawings.

A further preferred embodiment according to the present invention relates to a bicycle comprising an actuation surface, such as an actuation plate, for actuation of the bolt by means of pushing or kicking against it, which actuation surface is preferably arrangeable at the housing and/or a stay of the tube assembly, such as a front stay or rear (under) stay. An advantage of such an actuation surface, such as the actuation plate is that actuation of the lock by means of operating of the bolt is relatively easy with the food by tapping against the actuation surface, such as the actuation plate, such as in comparison with a number of described preferred embodiment.

Further preferably, the actuation surface, such as the actuation plate is hingedly mounted to the housing and/or in the stay; and/or is provided with a sliding mounting and/or is provided with biasing means for a resilient arrangement relative to the tube assembly. With this, an easily recognizable, robustly operable actuation surface, such as a tap against surface, is provided. The hinge is both horizontally and vertically envisioned. Further preferably, it is provided that the actuation plate has a curvature at the bottom side for the purpose of providing a smooth tap against surface for example a shoe.

According to a further preferred embodiment, the bicycle comprises a knob with a knob surface attached to the covering the bolt for providing of an operability to the bolt by means of the knob surface, wherein preferably the knob surface has an elongated shape in a substantially aligned direction with the rear stay, rear under stay and/or the housing, further preferably with a length that is bigger than half the length of the housing, further preferably bigger than two thirds of the housing, further preferably bigger than three quarters of the housing, further preferably bigger than the length of the housing, such as for example 1 and a half to 2 times the length of the housing. With this, an alternative for the actuation surface as provided in the shape of surface of the knob is provided.

According to a further preferred embodiment, the knob comprises guide means for guiding thereof relative tube assembly at the location of the arrangement of the knob. Such guide means are preferably embodied as pins or strips that extend in the direction of the tube assembly and/or the housing for guiding thereof through openings for receiving of the pins or strips. Further preferably, biasing means for biasing of the knob relative to the tube assembly and/or the housing are provided, preferably for keeping the knob at a predetermined distance relative to the tube assembly and/or the housing.

For the purpose of forming receiving means, the bicycle lock further preferably comprises a receiving member formed by a substantially disc-shaped member with yielding elements for yielding the pressure of the balls while moving the bolt to the blocking state and are substantially shape fixed in the pressure of the bolt in any direction of the plane of the disc; wherein the yieldable elements are preferably embodied as flange segments suitable for yielding out of the plane of the disc under pressure of the bolt and with a fixed form under pressure of the bolt in the plane of the disc; and/or wherein the yieldable elements are mountable yieldably to the receiving member. With this, it is advantageously realized that for example 1 or 2 yieldable elements yield under a load of the bolt when the bolt is actuated and touches the respective one or two yieldable elements. With this, the bolt is blocked by the not touched yieldable elements, such as next to the at least as seen in the rotational direction of the disc. Preferably, the bolt is smaller than the pitch of the yieldable elements such that in the blocking state the bolt keeps one yieldable element yielded. In combination with the bolt, the other yieldable elements calls that the receiving member is blocked while the bicycle is locked. Such a preferred embodiment would even function in case nearly one yieldable member is present. A further advantage of such preferred embodiment is that in each rotational position of the receiving member, the bolt can be actuated without this being blocked by the receiving member.

According to a further preferred embodiment of the bicycle lock, the receiving member is formed comprising a receiving disc that is movable relative to the wheel, such as rotatable, such as for receiving of the bolt, comprising at least one cam, or a number of cams, for near the surface of the disc, between the cams the finding of the state of cooperation or a receiving space for the bolt, further preferably wherein the at least one cam, or the number of cams, is provided with a pointy agent or a narrow upper surface, further preferably provided with a bearing disc for bearing of the receiving disc, comprising the guiding means, such as fire means for providing of the move ability or the rotate ability of the receiving disc. An advantage of such a preferred embodiment is that in each position or substantially each position, the bolt is actuable relative to the receiving member. In case it would hit on the cam, it is realized that the bolt would rotationally or sideways yield such that the actuating of the bolt still would not hit on the cam, but slide past it.

A further aspect according to the present invention relates to an end piece of a tube element comprising a space for receiving and/or locking in of a bicycle lock according to one or more of the preceding claims. Embodiments according to this aspect according to the present invention have similar advantages as described relative to the above aspect. Such an end piece of the tube element preferably forms the housing of the bicycle. Further preferably, the parts according to the present invention of the bicycle lock are arrangeable therein. Furthermore, in this space, a subpart or body, such as a molding piece, as described is preferably arrangeable.

A further aspect according to the present invention relates to a ring or disc for cooperating with a bicycle lock according to the present invention comprising openings and/or recesses for receiving of the latch, further preferably wherein the openings and/or recesses are provided with tapered walls. Embodiments according to this aspect according to the present invention have similar advantages as described relative to the above aspect.

BRIEF DESCRIPTION OF THE DRAWINGS

Further advantages, features and details of the present invention will be further elucidated on the basis of a description of one or more preferred embodiments with reference to the accompanying figures. Similar yet not necessarily identical parts of different preferred embodiments may be indicated with the same reference numerals.

DESCRIPTION OF THE INVENTION

Figure 1:
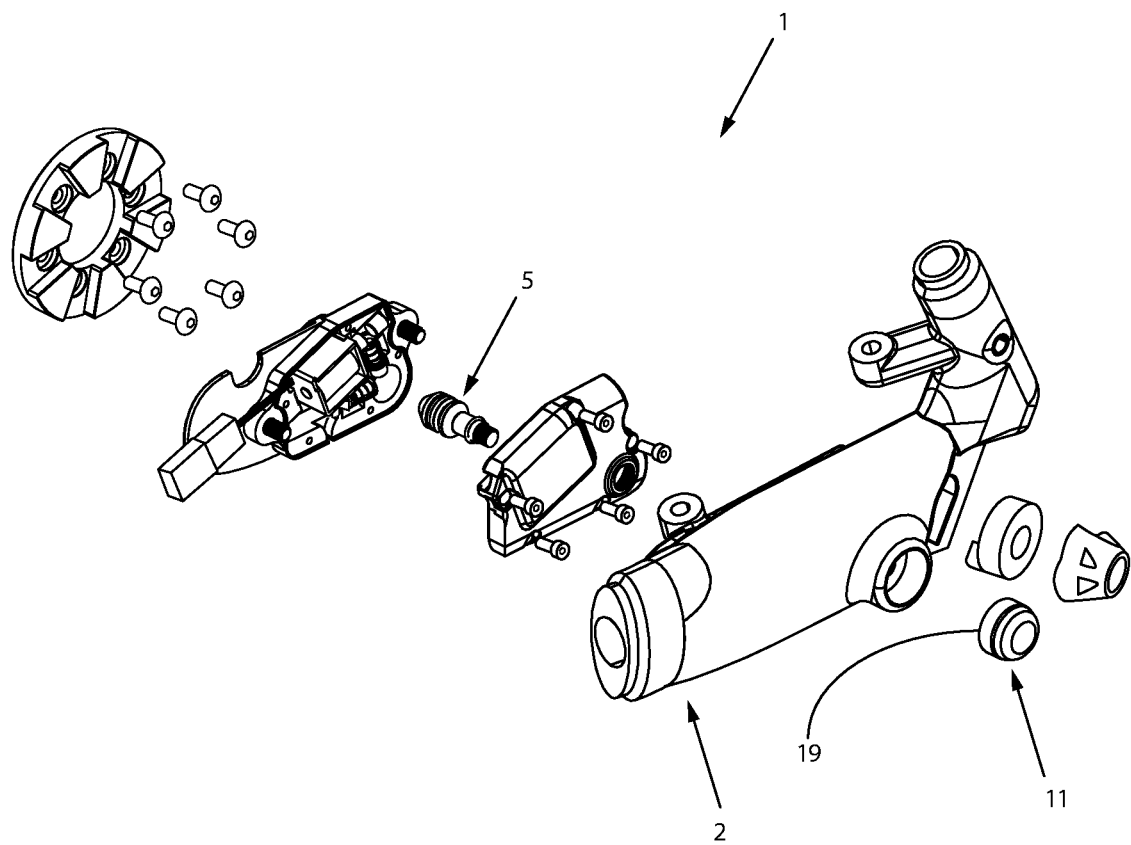
FIG. 1 relates to an exploded perspective view of a first preferred embodiment according to the present invention.
Figure 2A:
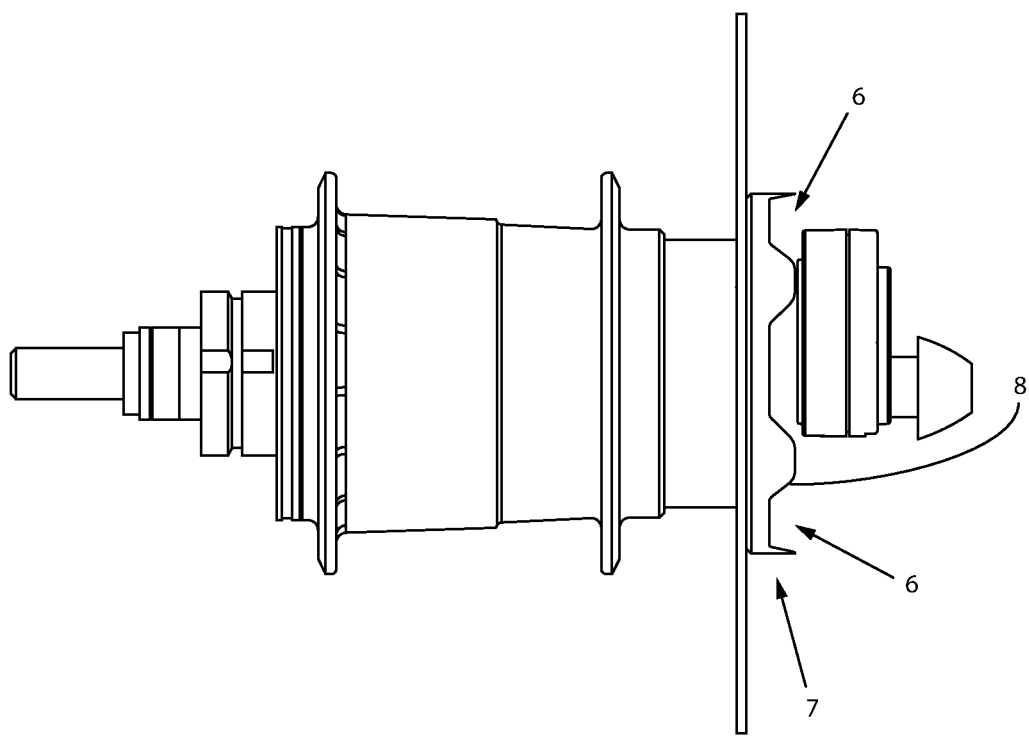
FIG. 2 relates to a schematic representation inside view of the preferred embodiment according to relative to a wheel hub with a break disc.
Figure 2B:
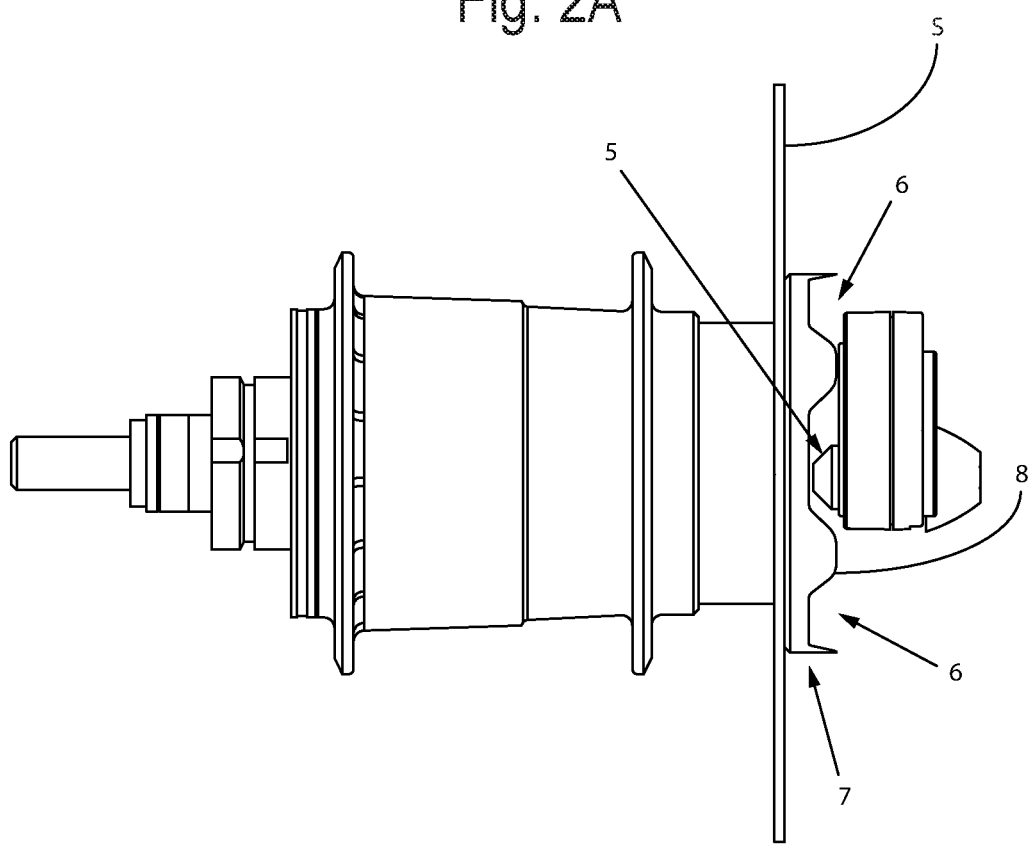
Figure 3A:
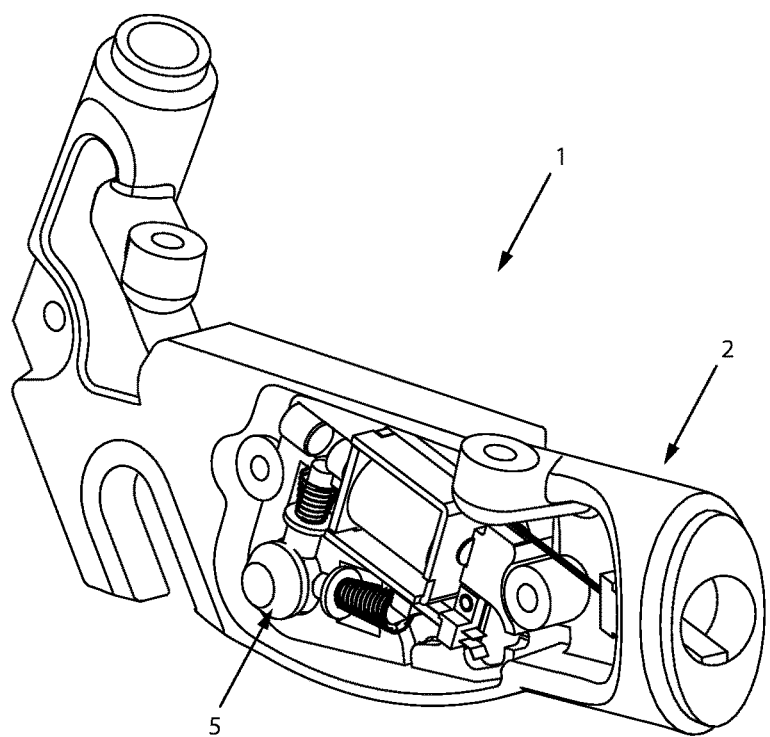
FIG. 3 relates to two representations in perspective view of the preferred embodiments according to a FIG. 1.
Figure 3B:
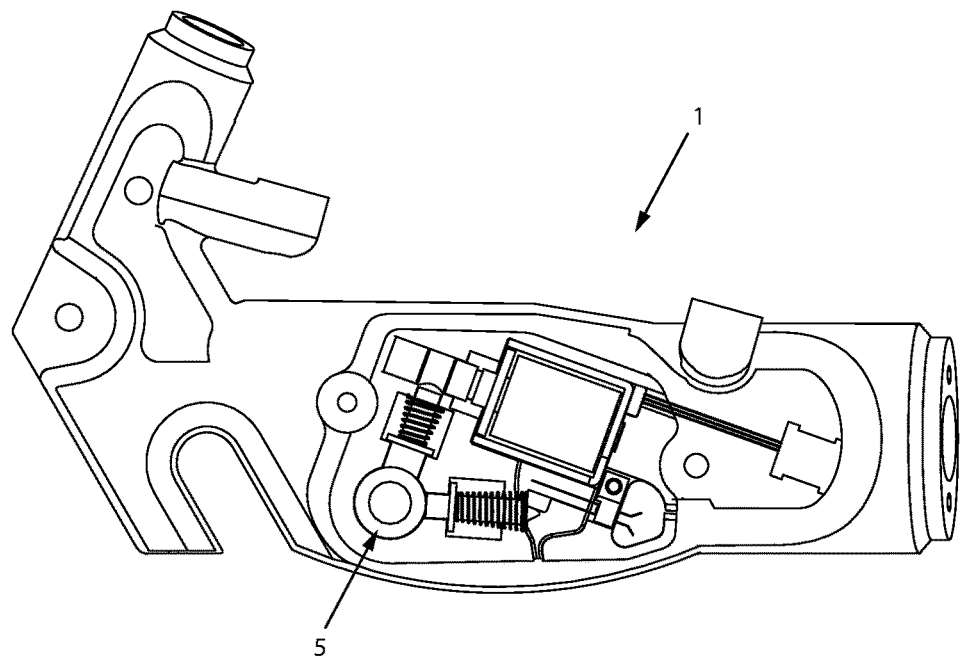

A first preferred embodiment (FIG. 1) according to the present invention relates to a bicycle lock. A first preferred embodiment (FIG. 1-FIG. 5) according to the present invention relates to a bicycle lock that is integrated in an end part of a rear bottom stay 2 of a bicycle. The bicycle lock comprises a housing 3 with therein a through opening 4 for a bolt 5.

The bolt 5 serves the purpose of being received in receiving means, such as embodied here by means of recesses 6 in a disk 7 that is mounted to a disc brake S. Alternatively, a disc brake that is firm enough could serve the purpose of receiving the bolt. At an operable end, the latch is provided with a button 11 with which the bolt is operated by pushing by means of the hand or the foot of the user of the bicycle. In case the bolt is pushed in into a recess of the disc, the wheel of the bicycle is blocked against rotating and therewith the bicycle is locked.

Figure 4A:
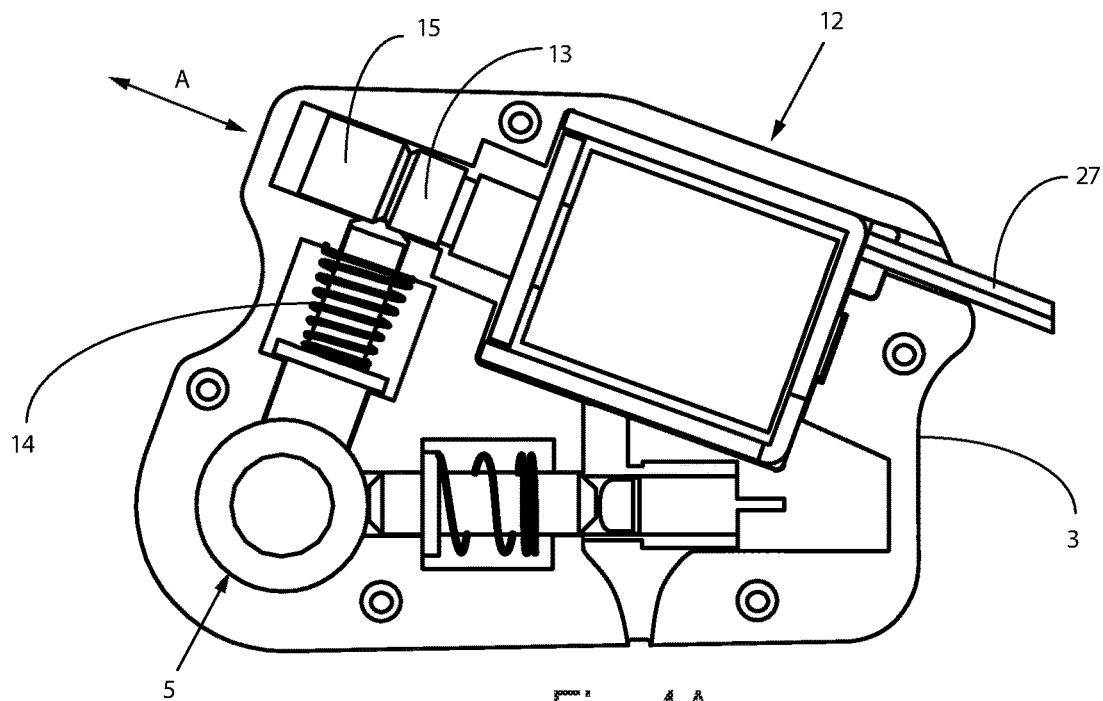
FIG. 4 relates to two representations inside view of a detail of the preferred embodiment according to FIG. 1 FIG. 5 relates to two representations in perspective view of a further detail of the preferred embodiment according to FIG. 1.

For the purpose of keeping the bolt 5 in the blocking state, a solenoid 12 is provided with a solenoid pin 13 that is movable in a direction of the arrow A. The solenoid is controlled from a control unit of the bicycle for unlocking of the lock from the locked state such as is shown in FIG. 4A. The latch moves in the direction of the arrow B. The latch is under bias from a spring 14 in order to urge the bolt in the blocking state when under this bias.

In the locked state of the lock, the latch blocks a tapered surface 51 of the bolt such that it is locked in the blocking state. In the open state, the tip 17 of the latch 16 is located at the location of the positioning slot 52 of the tip 53 of the bolt 5.

Figure 4B:
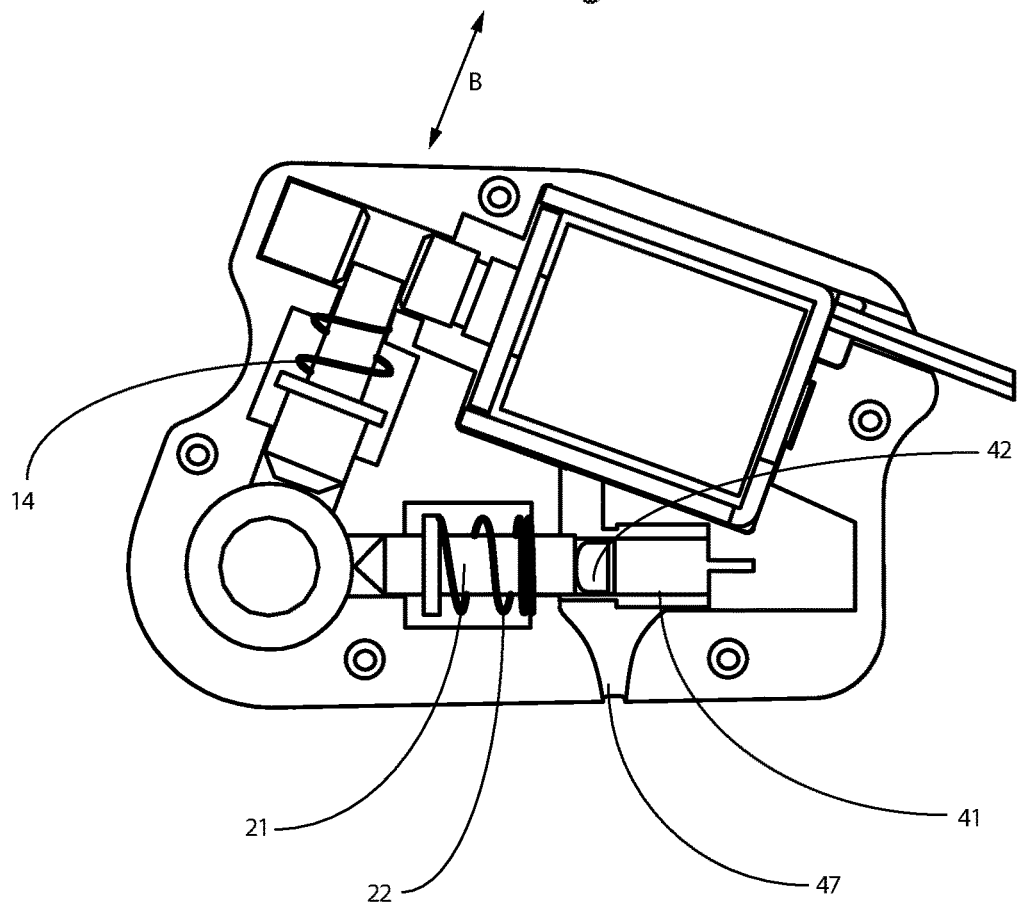
Figure 5A:
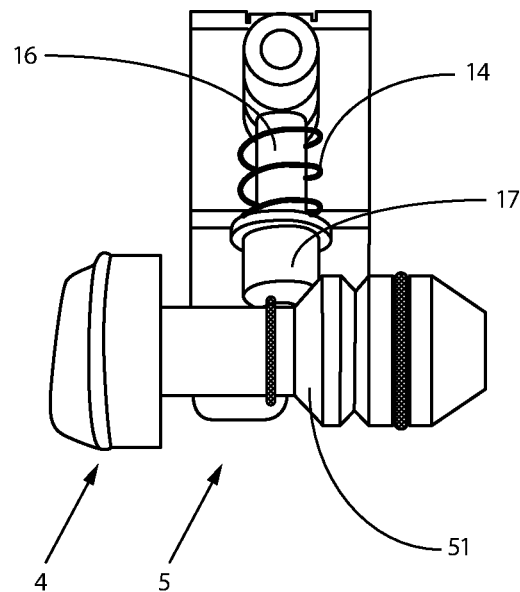
Figure 5B:
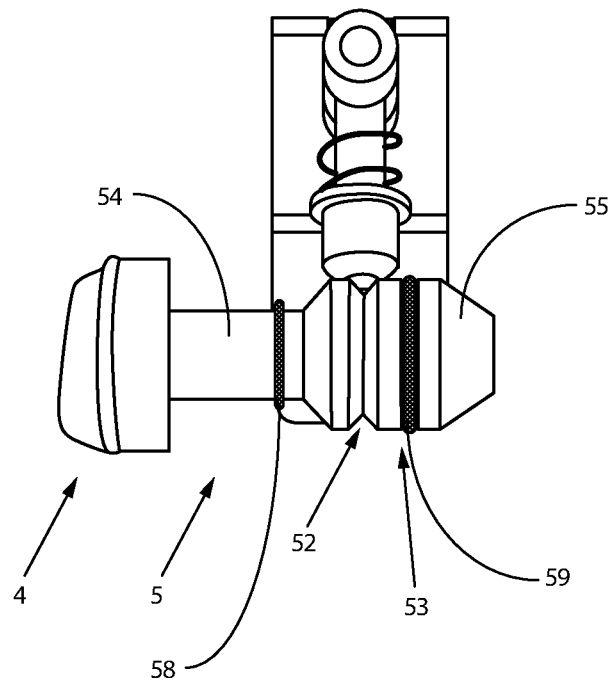

For opening of the lock, it is both required that the solenoid transitions to the state according to FIG. 4 B, and that the user rotates the wheel such that the tapered surfaces 8 of the recesses 6 urge the bolt to the opened state. To this end, the tapered surfaces 8 of the recesses interact with the tapered surface 55 of the tip 53 of the bolt. This is only possible when the control unit of the bicycle transfers the solenoid to the state according to FIG. 4 B. The solenoid interacts with the magnet 15 by means of generating a magnetic field that is directed at attracting of the magnet in the blocked state and directed at repelling of the magnet in the open state.

Furthermore, the lock has positioning means for keeping the bolt in the opened state. These positioning means comprise a pin 21 that is under bias of a spring 22 for pushing into a slot 52 of the tip of the bolt 5. With this, it is prevented that the bolt moves to the locking state without intention.

A switch 41 is switched by the pin 21 by means of the blade spring 42. The switch 42 serves the purpose of informing the central processing unit of the bicycle of a status of the lock. The position of the pin 21 indicates whether the bolt is in the blocking state in which the pin extends to the surface 54 of the bolt, or that the bolt is in the open state in which the pin extends in slot 52 of the tip of the bolt.

The bolt has a marker ring 19 that more clearly indicates in a visible manner to the user that the lock is in the open state and that the bolt is in the slid out state. The cable 17 serves the purpose of communicating with the control unit of the bicycle and provides a control of the solenoid and a signal relating to the state of the switch by means of four wire kernels. With the information relating to the status of the lock, the control unit is capable of switching on and off of an alarm while taking into account this information as well as information relating to a contact lock function of the control unit itself. It is also provided that the control unit activates the solenoid when the bicycle has a predetermined speed, such as 3 km/h in order to prevent that the lock gets blocked in the blocking state by accidentally touching of the bolt during driving or movement of the bicycle. The housing has a through opening 47 at the bottom side thereof for draining moisture. Furthermore, the lock has sealing rings 58, 59 for preventing of entry of such moisture.

Figure 6:
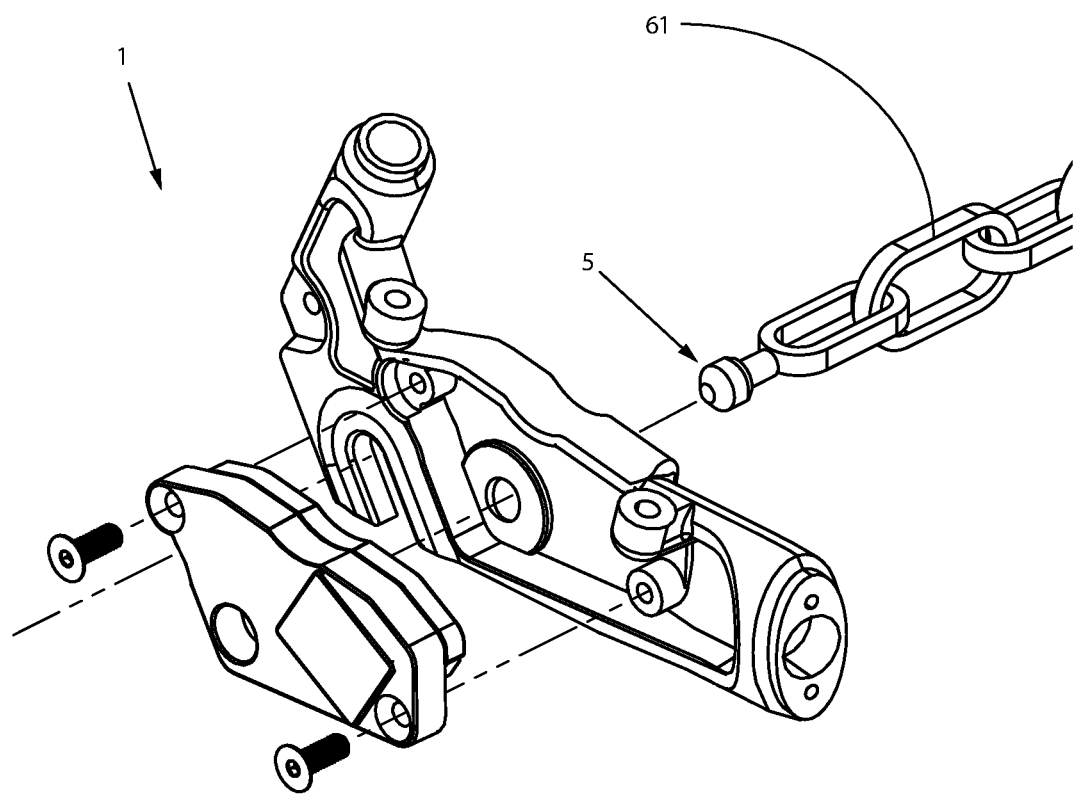
FIG. 6 relates to an exploded perspective view of a further preferred embodiment according to the present invention.

The preferred embodiment according to FIG. 6 differs from the embodiment of FIG. 1-5 in that the bolt is removable from the housing and mountable to a chain 61. With this, the lock, and therewith the bicycle, is fastenable to an object, such as a pole, fencing or bicycle support, such as a staple.

Figure 7:
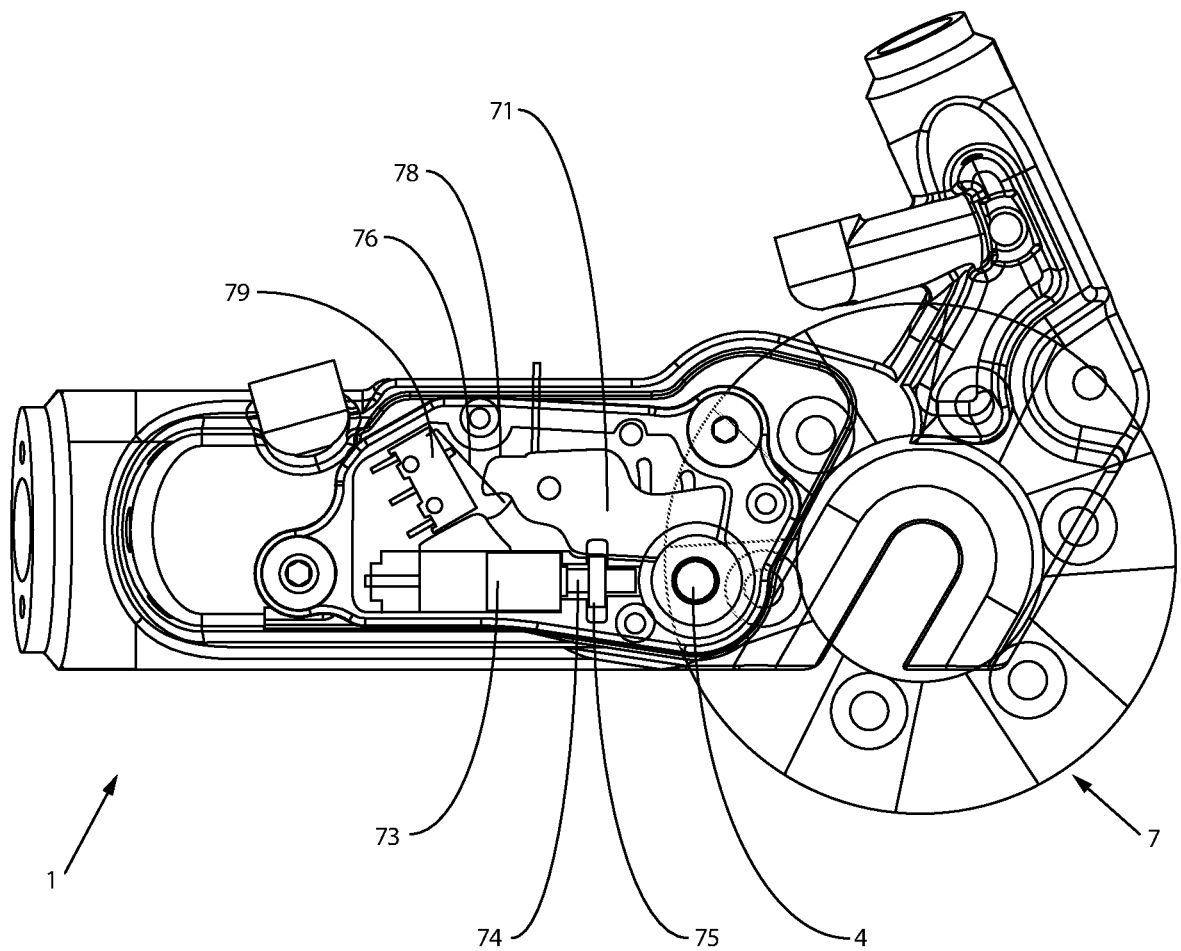
FIG. 7 relates to a schematic representation inside view of a further preferred embodiment according to the present invention.

In the preferred embodiment according to FIG. 7, the latch 71 is embodied as a cantilever latch for latching of the bolt. For the purpose of operating of the cantilever latch, a motor 73 is provided that drives cam 75 by means of a tapering for appropriately moving of the cam for releasing of the bolt. Also here, a switch 79 is provided that serves the purpose of a sensor for the purpose of the control unit of the bicycle for passing through to it of a status. The switch is actuated by means of a cam 78 that pushes against a spring 76.

Figure 8A:
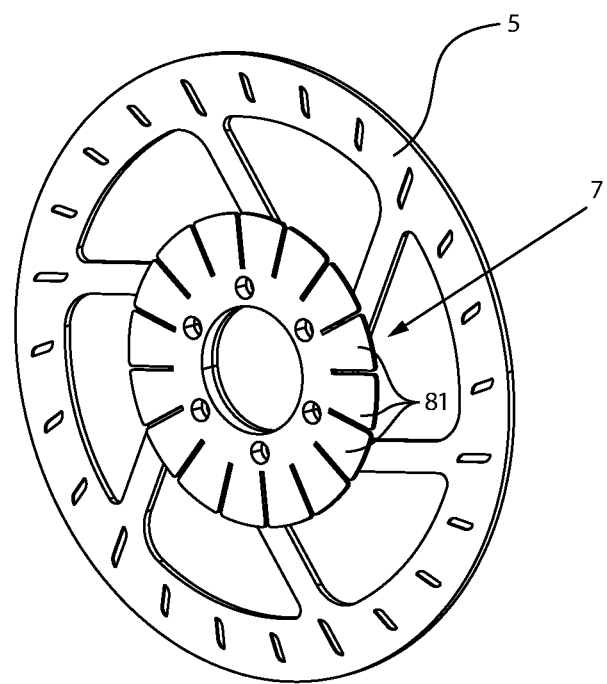
FIG. 8 relates to two views of a further preferred embodiment according to the present invention.
Figure 8B:
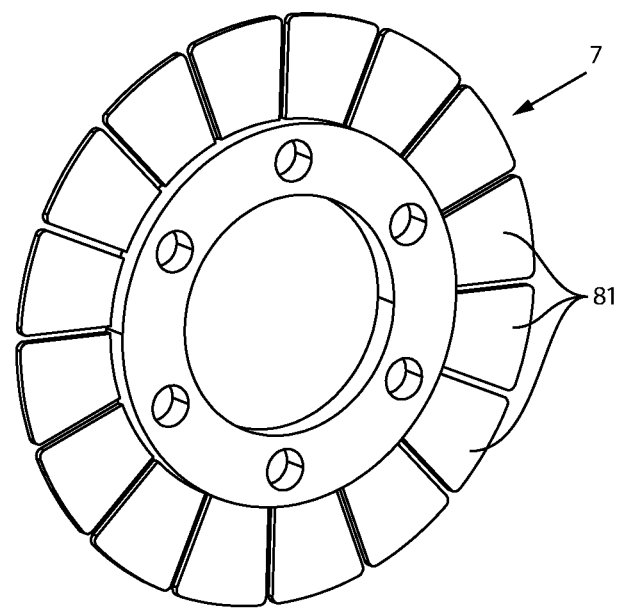

FIG. 8 relates to a preferred embodiment in which the receiving means are embodied as a disk with yieldable flange parts 81. The flange parts 81 are embodied such that these yield under pressure of the bolt 5 when it is actuated perpendicularly to the disk. In the rotational direction of the disk, the flange parts are substantially rigid and these are restrained by the bolt. With this, it is advantageously realized that the bolt is actuable in each rotational position of the disk wherein at any point one or mostly two of the flange parts 81 are urged to yield by the bolt. A purpose of conceiving this embodiment is that it was advantageously achieved that the rotational position of the disk poses no hindrance to actuating of the lock and there with locking of the lock.

Figure 9A:
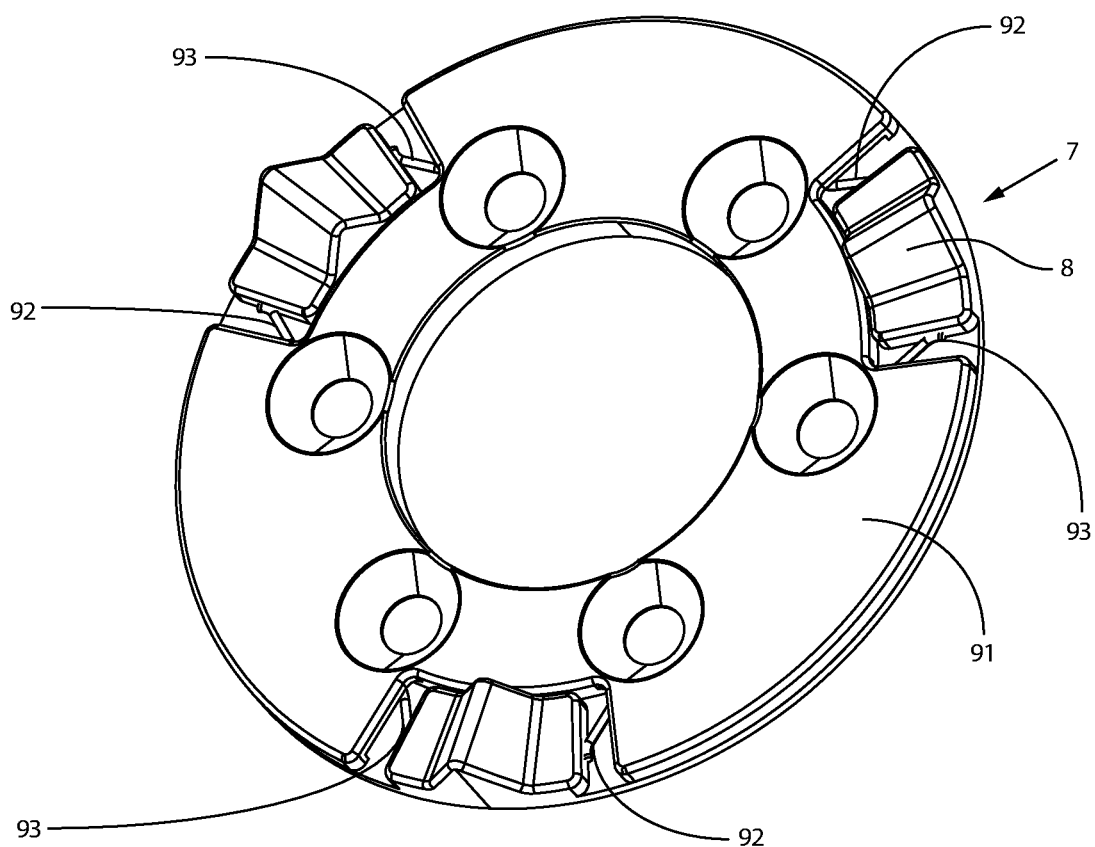
FIG. 9 relates to three views of a further preferred embodiment according to the present invention.
Figure 9B:
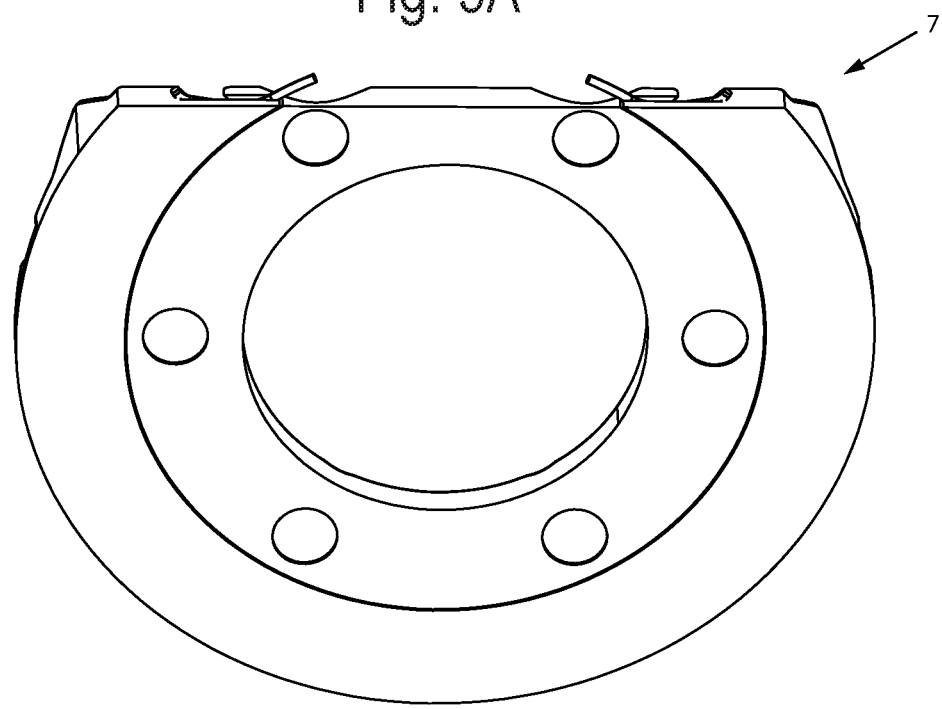
Figure 9C:
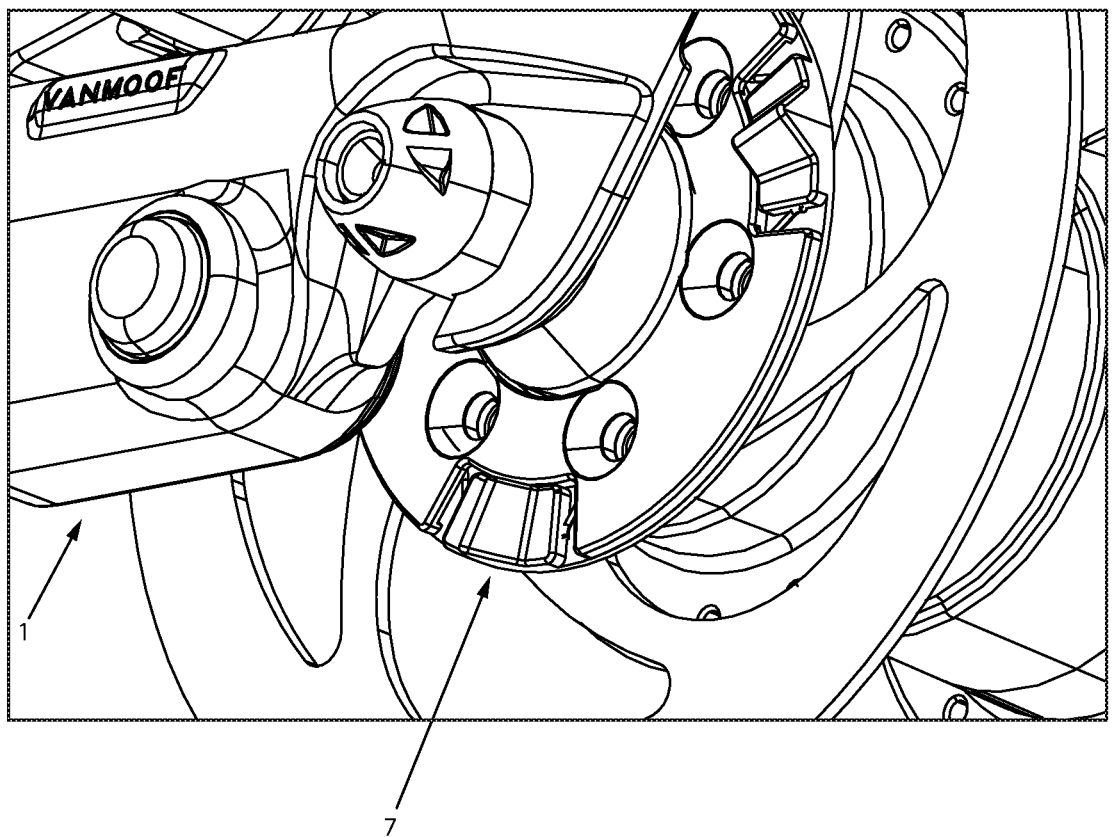

In a similar manner, the preferred embodiment according to FIG. 9 is conceived. In this preferred embodiment, the disk 7 is provided with very narrow cams 8. Because the cams are very narrow, a very narrow contact surface or contact volume is present for touching of the bolt when the same is actuated. Furthermore, the disk is rotatable relative to a support disk 91, which support disk 91 is mountable to the disk brake S or to a hub of the wheel, in a similar manner as the above preferred embodiments. The cam disk 7 can rotate relative to the, to the brake disc mounted, support disk over an angle of several degrees, such as 10-15°. Biasing means 92, 93 are optionally provided for keeping in a central position of the cam disk relative to the support disk.

Figure 10:
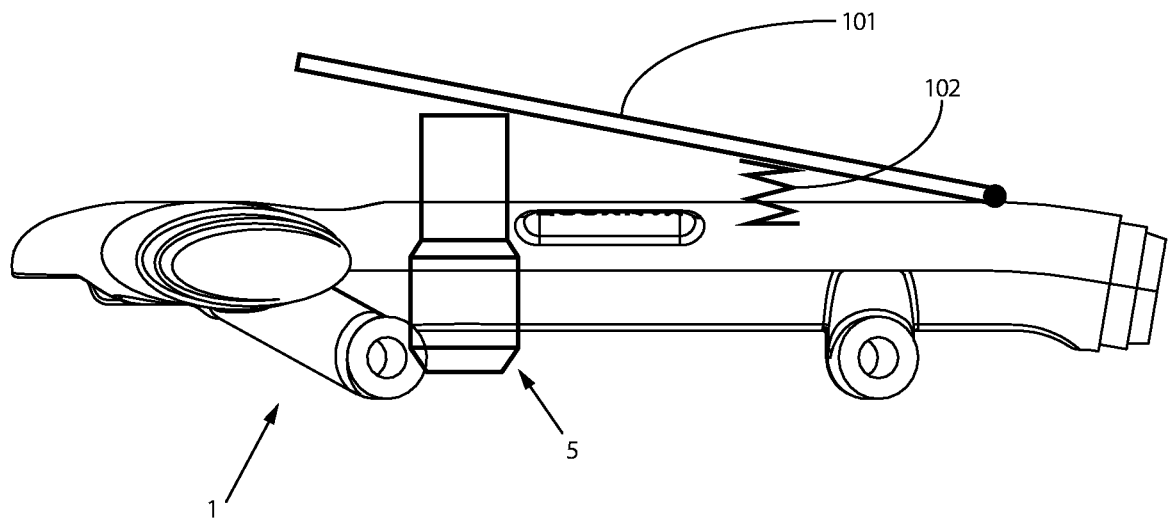
FIG. 10 relates to a view of a further preferred embodiment according to the present invention.

A preferred embodiment according to FIG. 10 provides a large actuation surface 101 for the bolt 5. This actuation surface is positionable under bias of a spring 102.

The actuation serve as optionally provided with a curved bottom side for extending under the stay for providing of a contact friendly tap against surface.

Figure 11:
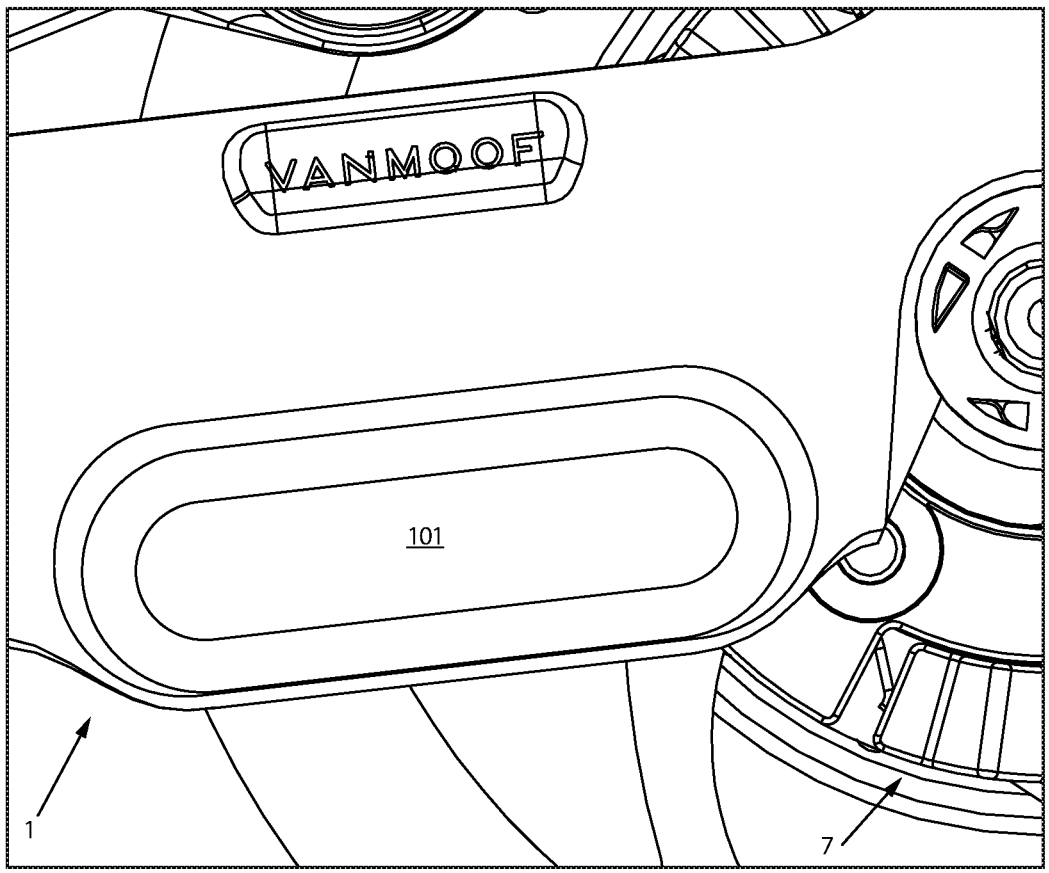
FIG. 11 relates to a view of a further preferred embodiment according to the present invention.

Alternatively, according to FIG. 11, and operating button 111 for the bolt is provided with a large tap against surface. This operating button is also provided for a relatively large ease of use for the user of the bicycle lock.

The present invention is described in the foregoing on the basis of preferred embodiments. Different aspects of different embodiments are expressly considered disclosed in combination with each other and in all combinations that on the basis of this document, when read by a skilled person of the area of skill, fall within the scope of the invention or are deemed to be read with the disclosure of this document. These preferred embodiments are not limitative for the scope of protection of this document. The rights sought are defined in the appended claims.

The invention claimed is:

1. A bicycle comprising a tube assembly comprising a frame comprising tube elements mutually fixed to each other, and movable tube elements, the bicycle comprising:
   a bicycle lock for blocking a wheel of a bicycle in a locked state of the bicycle, the bicycle lock comprising:
      a housing, wherein said housing is mounted to and/or forms part of the tube assembly,
      a bolt for blocking the wheel in a blocking state of the bolt,
      a channel, formed in the housing, wherein the bolt is slidably arranged or arrangeable in said channel, and
      a latch for, in a latching state of the latch, keeping the bolt in the blocking state,
   wherein, in the locked state of the bicycle:
      the latch latches the bolt in the blocking state, and the bolt is co-acting with a receiving space arranged at a wheel, wherein the bolt is partially accommodated in the receiving space, defining a state of cooperation in which the bolt and the receiving space block the wheel of the bicycle.

2. The bicycle according to claim 1, wherein the housing is attached to a front stay or rear stay of the tube assembly.

3. The bicycle according to claim 1, wherein the receiving space is arranged at a rear wheel.

4. The bicycle according to claim 1, wherein the receiving space is formed and/or is part of the lock which is provided with a receiving member or receiving assembly.

5. The bicycle according to claim 4, wherein the receiving member is formed by a ring or disk mounted to the wheel or wherein the receiving member comprises openings and/or recesses for receiving the bolt, wherein the openings and/or recesses are provided with tapered walls.

6. The bicycle according to claim 1, wherein the latch is a sliding latch or a cantilever latch.

7. The bicycle according to claim 1, further comprising bolt actuation means for actuating the bolt, from and/or to the blocking state.

8. The bicycle according to claim 1, further comprising latch actuation means for actuating the latch, from and/or to the latching state.

9. The bicycle lock according to claim 1, further comprising a latch blocking assembly for keeping the latch blocked in the latching position, comprising an electric actuator
comprising a latch unblocking assembly for moving the latch out of the latching position.

10. The bicycle according to claim 1, further comprising an electric actuator.

11. The bicycle according to claim 1, further comprising a state sensor, for perceiving whether the bolt is in the blocking state, wherein the state sensor is connectable with a control unit of the bicycle for the purpose of receiving a status signal of the state sensor by the control unit.

12. The bicycle according to claim 1, further comprising a positioning pin for keeping the bolt out of the blocking state.

13. The bicycle according to claim 1, wherein the bolt is removable from the channel.

14. The bicycle according to claim 13, wherein the lock is removable from the housing and attached to an attachment cable for attaching the bicycle to a thereto suitable fixed element, such as a pole, lamp post, ring that is mounted to a façade, fencing and/or parking device for a bicycle.

15. The bicycle according to claim 1, wherein the housing is arranged in, is arrangeable in or is part of a stay of the bicycle.

16. The bicycle according to claim 1, further comprising an actuation surface, such as an actuation plate, for actuation of the bolt by means of pushing or kicking against it, which actuation surface is preferably arrangeable at the housing and/or a stay of the tube assembly, such as a front stay, or rear, or a rear under stay.

17. The bicycle according to claim 16, wherein the actuation surface, such as the actuation plate, is hingedly mounted to the housing and/or the stay, and/or is provided with a sliding mounting and/or is provided with spring means for a resilient arrangement relative to the tube assembly.

18. The bicycle according to claim 1, further comprising a knob with a knob surface attached to the bolt covering for providing an operability to the bolt by means of the knob surface.

19. The bicycle according to claim 18, wherein the knob comprises guide means for guiding thereof relative tube assembly at the location of the arrangement of the knob.

20. The bicycle according to claim 1, wherein the receiving means are formed by a substantially disc-shaped member with yielding elements for yielding the pressure of the bolt while moving the bolt to the blocking state and are substantially shape fixed in the pressure of the bolt in any direction of the plane of the disc.

21. The bicycle according to claim 1, wherein the receiving member is formed comprising a receiving disc that is movable relative to the wheel for receiving of the bolt, comprising at least one cam, or a number of cams, for near the surface of the disc, between the cams the finding of the state of cooperation or a receiving space for the bolt.

22. An endpiece of a tube element comprising a space for receiving and/or locking in of a bicycle lock according to claim 1.

23. A ring or disc for cooperating with a bicycle lock according to claim 1, further comprising openings and/or recesses for receiving of the latch, wherein the openings and/or recesses are provided with tapered walls.

* * * * *